Patented Sept. 24, 1935

2,015,536

UNITED STATES PATENT OFFICE 2,015,536

SINTERED HARD METAL ALLOY

Karl Schröter, Berlin-Lichtenberg, Kurt Agte, Berlin-Lichterfelde-Ost, Kurt Moers, Berlin-Steglitz, and Hans Wolff, Berlin, Germany, assignors, by mesne assignments, to General Electric Company, Schenectady, N. Y., a corporation of New York No Drawing. Application March 24, 1932, Serial No. 601,042. In Germany July 18, 1931

10 Claims. (Cl. 75—1)

The invention relates to sintered hard metal alloys.

A number of hard metal alloys suitable for the manufacture of working tools and implements for machining purposes have been proposed the most satisfactory of these, from the standpoint of machining at high cutting speed and with small wear the hardest and toughest materials, such as cast iron or manganese steel, being a sintered mixture of tungsten carbide and an additional auxiliary metal of the iron group and of a lower melting point. Experience has shown, however, that in machining less hard materials, such as ordinary steel, this alloy and similar alloys are not always the most suitable ones in technical respects. For, when tools of such a composition are used for machining purposes, sometimes crater-like holes occur at the cutting edges which holes more and more enlarge in the course of the machining operation and very soon destroy the tools.

The primary object of the present invention is to overcome this drawback to a very large extent and to produce working tools and implements of the kind stated which are suitable for a very economical machining of less hard materials, such as ordinary steel; that is, machining at very high cutting speed and with very small wear. As exhaustive researches and tests have shown, this object is achieved by employing for the tools a hard alloy which contains, at least as a part of the component of higher melting point, a hard titanium compound, the percentage of auxiliary metal of lower melting point depending on the work to be done by the tool in the special case. Alloys of this type may for instance have the following composition: 75% titanium carbide and 25% nickel, or 95% titanium carbide and 5% cobalt.

In such an alloy part of the titanium carbide may be replaced by tungsten carbide without interfering with the advantageous properties of these alloys as to prevention of the above-mentioned crater-like holes. On the other hand this substitution results in the further particular advantage that the alloys thereby acquire the high toughness peculiar to the sintered hard alloys hitherto used containing tungsten carbide and auxiliary metals. This toughness admits of machining even with shocks and blows exerted on the tool as for instance in turning surfaces interrupted by grooves, gaps or the like. So, for instance, tools of the following composition give excellent results: 10% titanium carbide, 75% tungsten carbide, 15% nickel, or: 30% titanium carbide, 60% tungsten carbide, 10% cobalt.

Finally, it has been found that if the titanium carbide is replaced in part by tungsten carbide, the remainder of the titanium carbide may be replaced partly or wholly by another titanium compound of high hardness such as nitride or boride of titanium. An alloy of this type may for instance have the following composition: 7% titanium carbide, 3% titanium nitride, 85% tungsten carbide, 5% cobalt.

Alloys of the composition hereinbefore described are capable of machining less hard materials, such as ordinary steel, at very high cutting speeds and with small wear, and thus under very satisfactory economical conditions. In addition, the present alloys are capable of very satisfactorily machining the hardest and toughest materials. Finally, they are well suited not only for material-detaching work but may be employed also for other implements such as drawing dies, and even for working parts of machinery which are exposed simultaneously to high temperatures and pressures, such as hot pressing dies.

The shaping and sintering of the present alloys may be carried out by the method previously used for other sintered metal carbide alloys. The sintering thus may take place either subsequent to the pressing of the powdered mixture forming the starting material, or together with the pressing operation.

What we claim and desire to secure by Letters Patent is:—

1. An alloy consisting substantially of 60 to 85% tungsten carbide, about 10 to 30% of titanium compound from the group titanium carbide, titanium nitride, titanium boride, and an appreciable amount up to about 25% of metal from the iron group.

2. An alloy consisting substantially of 60 to 85% tungsten carbide, about 10 to 30% titanium carbide and an appreciable amount up to about 25% of metal from the iron group.

3. An alloy consisting substantially of 60 to

85% tungsten carbide, about 10 to 30% titanium nitride and an appreciable amount up to about 25% of metal from the iron group.

4. An alloy consisting substantially of 60 to 85% tungsten carbide, about 10 to 30% titanium boride, and an appreciable amount up to about 25% of metal from the iron group.

5. An alloy consisting substantially of 75% tungsten carbide, 10% titanium carbide and 15% nickel.

6. A sintered composition consisting substantially of 60 to 85% tungsten carbide, about 10 to 30% of titanium compound from the group titanium carbide, titanium nitride, titanium boride, and an appreciable amount up to about 25% of metal from the iron group.

7. A sintered composition consisting substantially of 60 to 85% tungsten carbide, about 10 to 30% titanium carbide and an appreciable amount up to about 25% of metal from the iron group.

8. A sintered composition consisting substantially of 60 to 85% tungsten carbide, about 10 to 30% titanium nitride and an appreciable amount up to about 25% of metal from the iron group.

9. A sintered composition consisting substantially of 60 to 85% tungsten carbide, about 10 to 30% titanium boride, and an appreciable amount up to about 25% of metal from the iron group.

10. A sintered composition consisting substantially of 75% tungsten carbide, 10% titanium carbide and 15% nickel.

KARL SCHRÖTER.
KURT AGTE.
KURT MOERS.
HANS WOLFF.

CERTIFICATE OF CORRECTION.

Patent No. 2,015,536.  September 24 1935.

KARL SCHROTER, ET AL.

It is hereby certified that error appears in the printed specification of the above numbered patent requiring correction as follows: Page 2, second column, after line 15, insert the following as claim 11:

11. A hard alloy consisting of 30% titanium carbide, 60% tungsten carbide, and 10% cobalt.; and that the said Letters Patent should be read with this correction therein that the same may conform to the record of the case in the Patent Office.

Signed and sealed this 3rd day of March, A. D. 1936.

Leslie Frazer (Seal)  Acting Commissioner of Patents.

CERTIFICATE OF CORRECTION.

Patent No. 2,015,536. September 24 1935,

KARL SCHROTER, ET AL.

It is hereby certified that error appears in the printed specification of the above numbered patent requiring correction as follows: Page 2, second column, after line 15, insert the following as claim 11:

11. A hard alloy consisting of 30% titanium carbide, 60% tungsten carbide, and 10% cobalt.; and that the said Letters Patent should be read with this correction therein that the same may conform to the record of the case in the Patent Office.

Signed and sealed this 3rd day of March, A. D. 1936.

Leslie Frazer (Seal) Acting Commissioner of Patents.